United States Patent
Shibasaki

Patent Number: 6,084,623
Date of Patent: Jul. 4, 2000

[54] METHOD AND APPARATUS FOR THERMAL TRANSFER RECORDING

[75] Inventor: Naoji Shibasaki, Tokyo-to, Japan

[73] Assignee: Dai Nippon Printing Co., Ltd., Tokyo-to, Japan

[21] Appl. No.: 09/095,210

[22] Filed: Jun. 10, 1998

[30] Foreign Application Priority Data

Jun. 11, 1997 [JP] Japan ................................ 9-167922

[51] Int. Cl.$^7$ ................................ G06F 3/12; B41J 2/325
[52] U.S. Cl. ................................ 347/172
[58] Field of Search ................................ 347/174, 171, 347/172, 188, 211, 193, 218, 215, 176, 189, 194; 395/101, 102, 114

[56] References Cited

FOREIGN PATENT DOCUMENTS 62-238791   11/1987   Japan .
62-264994   11/1987   Japan .

*Primary Examiner*—Huan Tran
*Attorney, Agent, or Firm*—Ladas & Parry

[57] ABSTRACT

In order to prevent deformation in recorded images, positional misregistration in superposition recording, hue misregistration in color images, failures in hue repeatability, and the like in thermal transfer recording, there are provided a method and apparatus for thermal transfer recording, in which corrected image data are obtained by performing enlargement or contraction of image data depending on dimension changes caused in a recording medium if thermal transfer recording is performed, and the thermal transfer recording is performed on the recording medium based on the corrected image data.

6 Claims, 4 Drawing Sheets

METHOD AND APPARATUS FOR THERMAL TRANSFER RECORDING

BACKGROUND OF THE INVENTION

The present invention relates to a technique for thermal transfer recording by which images are superposedly recorded with preferable conditions, such as less positional misregistration, and/or less hue misregistration and superior hue repeatability in color images. In particular, the present invention relates to a method and apparatus preferred to thermal transfer recording where an objective image is produced by first performing thermal transfer recording of images on an intermediate transfer recording medium, and then the medium is transferred to a transfer receiving material.

Conventionally, there have been proposed a variety of thermal transfer recording techniques for recording images, in which a thermal transfer sheet, having a substrate sheet on which a coloring material layer is disposed on one of the surfaces, and a transfer receiving material, on which a receptor layer is disposed, are pressed between a heating device such as a thermal head and a platen roll, and the heat-generating members of the heating device are selectively heated depending on image information. As a result, the coloring material contained by the coloring material layer of the thermal transfer sheet migrates to the transfer receiving material, realizing the thermal transfer recording. Of these heat fusion type thermal transfer and sublimation type thermal transfer methods have been most commonly used.

The heat fusion type thermal transfer method uses a thermal transfer sheet that has a substrate sheet, such as a plastic film, on which a heat fusible ink layer is coated as a coloring material layer, the ink layer being formed by dispersing coloring material such as pigment into heat fusible binder such as wax or resin. Onto this thermal transfer sheet, thermal energy according to image information is applied with such a heating device as a thermal head, thereby the coloring material being transferred together with the binder on such a transfer receiving material as a paper or plastic sheet. Images produced by this heat fusion type thermal transfer method have higher density and superior sharpness, and is preferable to recording of binary images consisting letters and/or drawings.

By contrast, the sublimation type thermal transfer method uses a thermal transfer sheet and a transfer receiving material. The former has such a substrate sheet as a plastic film, on which a dye layer is provided as a coloring material layer, the dye layer being formed by dissolving or dispersing a sublimation dye adopted as a coloring material into binder resin. The latter is formed by providing a receptor layer for a coloring material on a support medium, including paper or plastic sheets. Onto the thermal transfer sheet, thermal energy depending on image information is applied with a heating device such as a thermal head. As a result, only the coloring material contained in the coloring material layer of the thermal transfer sheet migrates to the receptor layer, realizing image recording.

In performing recording based on each transfer method, thermal transfer sheets for various colors including yellow (Y), magenta(M), cyan(C), and black(K) are used for recording of images in a superposition fashion onto a transfer receiving material, providing multi-color or full-color image recording.

Of these recording methods, it is particularly true that the sublimation type thermal transfer method requires the image-formed surface of its transfer receiving material to have a dyeing property for dye employed as coloring material. Hence, it was almost impossible to form images on transfer receiving materials that do not have a receptor layer having a dyeing property. For forming images by means of the sublimation type thermal transfer method on transfer receiving materials other than dedicated sheets of paper on which a receptor layer is formed beforehand, as shown in Japanese Patent Laid-open(KOKAI) publication No. 62-264994, for example, there has been proposed an image-forming technique that a receptor layer is transferred to a transfer receiving material from a receptor layer transfer sheet whose receptor layer is formed to be transferred peelably to a substrate sheet, and then a coloring material is transferred thereon from a thermal transfer sheet. However, when the method is adopted, the receptor layer formed on the transfer receiving materials is greatly affected by the characteristics of the surface thereof. In some cases, there occur such problems as voids of the receptor layer that arise in recessed portions of the surface of the transfer receiving material, and/or irregularities on the receptor layer affected by those on the surface of the transfer receiving material, both of them resulting in the formation of ununiform images. Therefore, it was necessary to select flat- or smooth-surface transfer receiving materials for producing satisfied objective images.

For preventing influences on image qualities due to surface irregularities and/or texture of a transfer receiving material, and for making it possible to form objective images on any transfer receiving material, another transfer technique is proposed, as in Japanese Patent Laid-open(KOKAI) Publication No.62-238791. In this technique, an intermediate transfer recording medium is first prepared that has a receptor layer peelable on a substrate sheet, images are transferred from a thermal transfer sheet to the receptor layer by means of the sublimation type thermal transfer method, and the intermediate transfer medium on which the images are formed is superposed on a transfer receiving material to be heated. This permits the image-formed receptor layer to be transferred, as a whole, to the transfer receiving material.

In order to accomodate as many intermediate transfer recording media as possible in a thermal transfer recording apparatus and to lower the material costs, thin films are favorably used as a substrate sheet thereof. However, owing to the fact that thin films are film-formed under orientation in their longitudinal and lateral directions in the production, there occurs thermal contraction in the films when exposed to higher-temperature heat after completion of manufacturing. The same event is caused when thin films are used as a substrate sheet of an intermediate transfer recording medium. Specifically, heat is applied by a thermal head in forming images in the receptor layer of an intermediate transfer recording medium, thus causing contraction therein. In particular, in recording color images, since an objective color image is produced by superposing each color image of yellow (Y), magenta (M), cyan (C), and the like one on another, inaccurate positioning for each color image brings about an extremely poor appearance. Still, if the contraction of the substrate sheet of the intermediate transfer recording medium is brought about every time when forming each color image on the medium, differences in sizes of color images are generated, thereby making it impossible to accomplish an accurate superposition. The contraction or enlargement in the lengthwise direction (i.e., the conveying direction for conveying an intermediate transfer recording medium) can be suppressed to some extent by controlling a tension of conveying, but necessarily remains. In addition, since it is normal that tension is not applied in the widthwise direction (i.e., a direction perpendicular to the conveying direction of the medium), the contraction in the widthwise direction cannot be suppressed.

One example is such that in the case of forming a color image in three colors of Y, M and C on an intermediate transfer recording medium using a polyethylene terephthalate film having a thickness of 10 $\mu$m as a substrate, a contraction of approximately 0.6 to 1.0 mm over the lateral width of 180 mm was generated. This contraction amount agrees with a misregistration of approximately 8 to 13 dots in a picture element density of 12 dots/mm, and this amount of misregistration could not be ignored for producing a superior sharpness and an accurate color repeatability of images.

SUMMARY OF THE INVENTION

An object of the present invention is to provide an apparatus and method of thermal transfer recording capable of obtaining higher-quality recorded images that eliminates such shortcomings as deformation in recorded images, positional misregistration in superposition recording, hue misregistration in color images, and failures in color repeatability even when such an intermediate transfer recording medium using a thin substrate sheet described above is used as a recording medium in the thermal transfer recording.

The above object can be realized by the present invention which will be explained in detail below. One aspect of the present invention is a method of thermal transfer recording for performing thermal transfer recording on a recording medium based on corrected image data obtained through enlargement and contraction of image data in taking into account changes in dimensions which will be generated in the recording medium by the thermal transfer recording. Preferably, by the recording method according to the present invention, first, corrected image data are obtained by performing the enlargement or contraction of image data in consideration of changes in dimensions which will be caused in a recording medium by the thermal transfer recording. On the basis of the corrected image data, the thermal transfer recording is then performed onto the recording medium. That is, the changes in dimensions can be corrected. It can therefore be allowed to obtain higher-quality recorded images with no problems, such as deformation in recorded images, positional misregistration for superposition recording, hue misregistration in color images, and failures in color repeatability.

The present invention is still concerned with the method of thermal transfer recording for performing a plurality of times of thermal transfer recording onto a recording medium based on each set of corrected image data obtained by performing enlargement or contraction of each set of image data for a plurality of times of transfer recording, in agreement with each time of changes in dimensions which will be caused in the recording medium by performing a plurality of times of thermal transfer recording, in order to perform a plurality of times of the thermal transfer recording onto the recording medium in a condition of an accurate positional superposition. According to this recording method of the present invention, each set of image data are enlarged or contracted depending on each time of changes in dimensions which will be caused in a recording medium by performing the recording a plurality of times, thereby correcting each time of changes in dimensions. Accordingly, for performing the recording in a superposition fashion, positional misregistration, hue misregistration in an objective color image, failures in coloring repeatability, and the like are avoided, providing higher-quality images.

The present invention is also realized by a method of thermal transfer recording which performs the enlargement and contraction according to independent amounts in the primary scanning direction and/or secondary direction of a set of image data. By the thermal transfer recording method, image data are enlarged or contracted in agreement with changes in dimensions of a recording medium, which differ from each other in the primary and/or secondary scanning directions. Hence, those changes in dimensions can be corrected, providing further higher-quality recording images.

In recording method of the present invention, the enlargement or contraction of the image data is carried out by adding or deleting picture elements to or from the image data. Using this method, calculation of the enlargement or contraction of image data can be simplified.

Still, the present invention is realized by a method of thermal transfer recording, in which the recording medium consists of an intermediate transfer recording medium used in a thermal transfer recording method, in which a thermal transfer sheet having a thermally transferable coloring material layer and the intermediate transfer recording medium having a receptor layer are pressed between a heating device and a platen in a manner that the coloring material layer and the receptor layer are superposed with each other, the heating device is heated according to the image data, thereby a coloring material contained in the coloring material layer being transferred into the receptor layer for forming an image, the image formed on the intermediate transfer recording medium being then transferred, together with the receptor layer, onto such a transfer receiving material as sheets of normally-used paper. The recording method of the present invention permits the intermediate transfer recording medium whose substrate sheet is thin, thus deformation in recorded images being large, to suitably be used for producing higher-quality recorded images.

Another aspect of the present invention is realized by an apparatus for thermal transfer recording, comprising image dimension correcting means for obtaining corrected image data by either of enlargement or contraction of image data based on data indicative of changes in dimensions caused in a recording medium if thermal transfer recording is performed, and thermal transfer means for performing the thermal transfer recording onto the recording medium on the basis of the corrected image data. In the recording apparatus of the present invention, based on data indicative of changes in dimensions caused in a recording medium by performing the thermal transfer recording, image data are enlarged or contracted by the image dimension correcting means for producing corrected image data. Based on the corrected image data, the thermal transfer recording is performed onto the recording medium by the thermal transfer means. In consequence, such conventional drawbacks as deformation in recorded images, positional misregistration for superposing recording, hue misregistration in color images, and/or failures in coloring repeatability can be eliminated, providing higher-quality recorded images.

DESCRIPTION OF THE PREFERRED EMBODIMENTS

Figure 1:
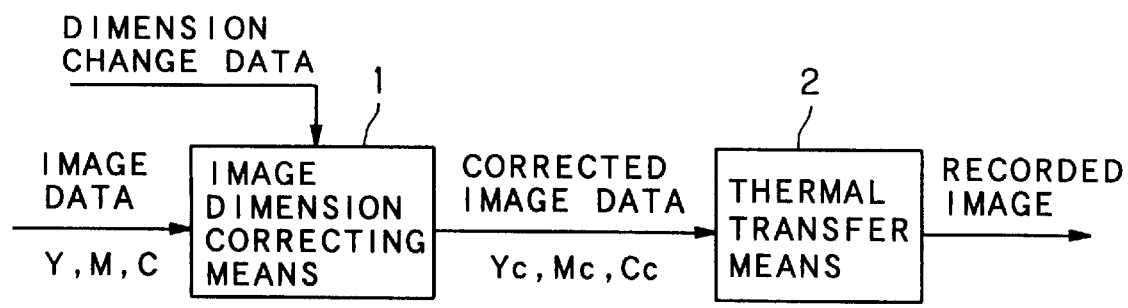
FIG. 1 is a schematic block diagram functionally showing a thermal transfer recording apparatus according to the present invention.

A method and apparatus for thermal transfer recording according to the present invention will now be described in detail. FIG. 1 illustrates the schematic block diagram functionally representing a thermal transfer recording apparatus of the invention. First of all, referring to FIG. 1, the present invention will be described conceptually. In FIG. 1, references 1 and 2 show image dimension correcting means and thermal transfer means, respectively. The image dimension correcting means 1 receives original image data, and produces corrected image data from the original image data based on data indicative of changes in dimensions (hereinafter, referred to as "dimension change data") corresponding to changes in dimensions (hereinafter, referred to as "dimension changes") which will be caused in a recording medium by performing thermal transfer recording.

Usually, the correction is carried out such that images given with a recording medium in which dimension changes have been caused due to the recording have desired dimensions. This correction is carried out independently row by row and/or column by column for each row(, or line) of picture elements of an image in its lateral direction and/or for each column(, line) of picture elements of an image in its longitudinal direction. Compared with scaling up or down the whole size of an image, the correction becomes more accurate. The number of picture elements in each row and/or column can equally be increased or decreased over the entire row and/or column, while it is not always necessary to equally be increased or decreased, depending on contents of images. By way of example, only the edges or the central part of an image may intensively be subjected to increasing or decreasing the picture elements.

When receiving the corrected image data, the thermal transfer means 2 carries out thermal transfer recording onto a desired recording medium.

The image dimension correcting means 1 consists of, for example, a data processing unit, such as a work station, personal computer, or microcomputer, while the thermal transfer means 2 consists of, for example, a normally-used thermal transfer printer. Both of the means 1 and 2 may be formed as two units mechanically separated from each other, or may be integrated into a single thermal transfer recording apparatus by incorporating for example, the data processing function given to the image dimension correcting means 1 into a normally-used thermal transfer printer.

Figure 2:
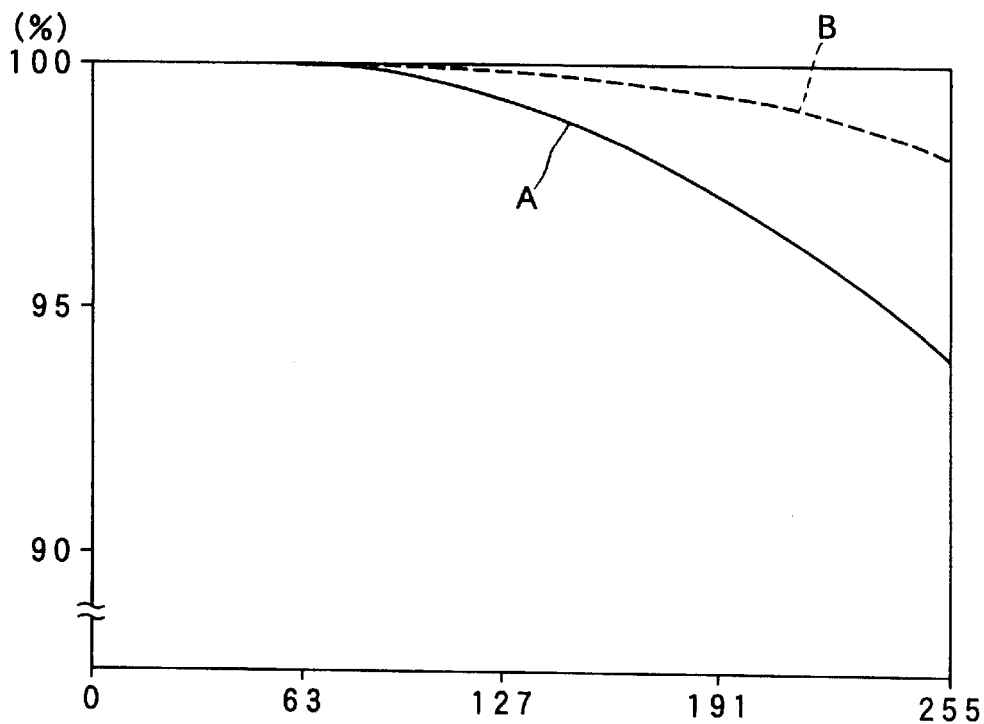
FIG. 2 shows one example of data of changes in dimensions.

FIG. 2 illustrates one example of dimension change data, in which the axis of abscissa expresses the picture element values and the axis of ordinates expresses dimension change values (enlargement or contraction rates) of a recording medium in percentage (%) denotation. For thermal transfer recording, energy defined by picture element values is provided to the heating element of a thermal head, thus heating a recording medium. In FIG. 2, a graph A indicates a dimension change curve in the lateral direction perpendicular to a direction along which a recording medium is conveyed, while a graph B indicates a dimension change curve in the longitudinal direction parallel to the conveying direction.

As shown by the dimension change curve A in FIG. 2, dimension change values remains at 100% in a range of smaller picture element values (values of 70 or less), with no dimension changes. As the picture element values increases, dimension change values gradually decreases from 100% (a picture element value of 70) to 94% (a picture element value of 255). According to curve A, a recording medium is subjected to dimension changes, causing contraction in the lateral direction. Change rates in the contraction along the curve A are not linear, and they are set to be slightly steeper than being proportional.

On one hand, shown by the dimension change curve B in FIG. 2, dimension change values remains at 100% in a range of smaller picture element values (values of 70 or less), with no dimension changes. As the picture element values increases, dimension change values gradually decreases from 100% (a picture element value of 70) to 98% (a picture element value of 255). According to the curve B, a recording medium is also subjected to dimension changes, causing contraction in the longitudinal direction. Change rates in the contraction along the curve B are not linear, and they are set to be slightly steeper than being proportional.

The curves shown in FIG. 2 provide a remarkably superior repeatability for the films manufactured in the same method, but provide a totally different repeatability depending on deferent manufacturing methods even when employing the same materials and same thickness. When the measurement of characteristics is executed after having repeatedly heated the same portion of a film, it is seen that its dimension changes little by little in a direction along which the contraction rate decreases. The change rates are also repeated extremely well in the films whose manufacturing methods are the same with each other, but are completely different from each other if manufacturing methods change, even when employing the same materials and thickness. In the case of a polyethylene terephthalate (PET) film of a thin thickness, which is a typical recording medium, changes in characteristics are small for repeated several-times of (5 or 6 times) heating to the same spot of the film.

Figure 3:
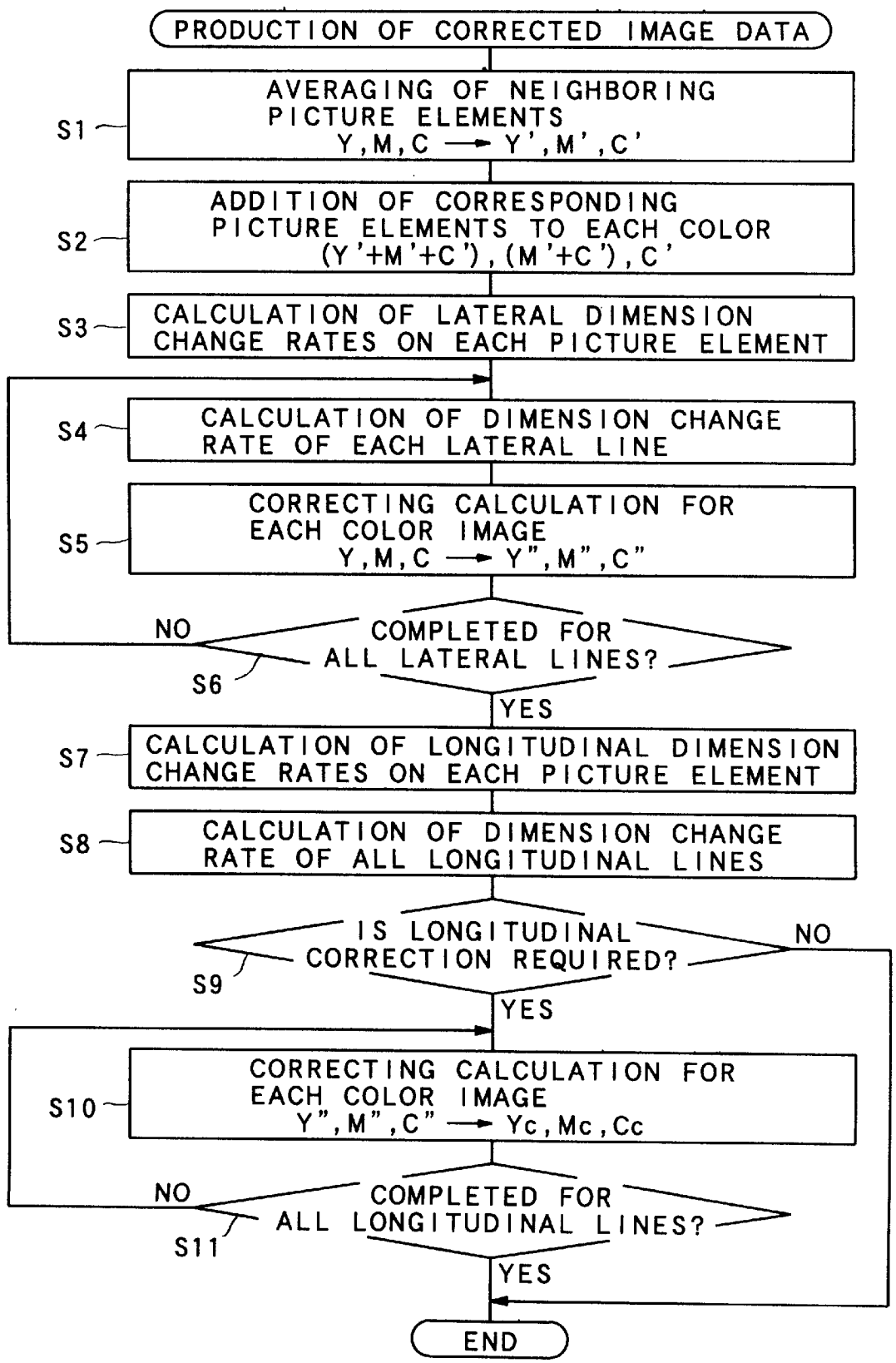
FIG. 3 is a flowchart showing one example of processing for producing corrected image data.

A procedure for producing corrected image data from image data using the dimension change data shown in FIG. 2 will now be described. FIG. 3 exemplifies a flowchart for a production procedure of corrected image data, in which shown is one example for producing corrected image data used in recording of color images in a manner such that images of three subtractive primaries of Y (yellow), M (magenta) and C (cyan) are superposedly printed one on another on a recording medium.

First, in step S1, for each picture element, image data (Y, M, C), averaging calculation is carried out over its neighboring picture elements to produce a new picture element value, thereby providing image data (Y', M', C'). This production of new image data is for taking into account the spread of both heat and dimension changes due to the heat in a recorded process during which heat emanated from the heating element of the thermal head 4 is transmitted to a transfer receiving material B through a thermal transfer sheet 2 (refer to FIG. 4). For this calculation, heating to 4-neighboring, 8-neighboring, or more neighboring picture elements can be taken into account. The averaging calculation to produce new picture element values is not limited to a simple averaging manner, but can be relied upon weighting averaging by which an appropriate weighting is adopted to each picture element and its neighboring picture elements. Alternatively, the process of step S1 may be omitted, or weighting factors for neighboring ones may be set to be zero.

In step S2, image data which reside at mutually corresponding picture element positions among individual color images are added to each other to obtain image data (Y'+M'+C') or (M'+C'). Also, image data (C') with no addition are obtained. Among them, the image data (Y'+M'+C') according to the addition of three color values takes into account of the fact that images which have been recorded onto a recording medium with image data (yellow) by the first printing change its dimensions under the influence of heat caused in the first printing itself and the subsequent two times of superposition printing. Also, the image data (M'+C') according to the addition of two color values takes into consideration that images which have been recorded on the recording medium with image data (magenta) in the second printing change its dimensions under the influence of heat caused in the second time of printing itself and the subsequent last printing. The image data (C') considers that its dimensions change under the influence of heat caused in the last printing.

In step S3, for each of the image data (Y'+M'+C'), (M'+C'), and (C') obtained in the above step S2, dimension change rates in the lateral direction, which correspond to picture element values, are then calculated for every picture element, with reference to the dimension change data described in FIG. 2.

In step S4, the dimension change rates over one line in the lateral direction for each set of image data obtained above are then calculated. In other words, the dimension change rates over each of the picture element lines perpendicular to a direction along which the recording medium is conveyed are calculated using the results in the foregoing step S3. By way of example, the dimension change rates over the picture elements of each lateral line obtained in step S3 undergo simple averaging.

In step S5, for each color image set of the original image data (Y, M, C), correcting calculation is carried out to correct the dimension changes in the lateral direction. This correction is to correct the number of picture elements residing in each lateral picture element line. Thus, calculation for increasing or decreasing the number is performed (in one example shown in FIG. 3, because correction is carried out for contracting an image, the number of picture elements are increased).

Specifically, for yellow (Y) image data, the correction is carried out for corresponding each lateral line, based on the dimension change rate of each lateral line derived from the image data (Y'+M'+C'). For magenta (M) image data, the correction is carried out for corresponding each lateral line, based on the dimension change rate of each lateral line derived from the image data (M'+C'). Still, for cyan (C) image data, the correction is carried out for corresponding each lateral line, based on the dimension change rate of each lateral line derived from the image data (C').

A variety of methods of calculating enlargement and contraction of digital image data are known. Hence, applying the known methods to the image data for every lateral line enables the correcting calculation.

In general, a mathematical interpolation method can be used. Specifically, assume that a function $f(x)$, which has appropriate continuity, shows values $f_0, f_1, f_2, \ldots, f_n$ at $n+1$ points $x_0, x_1, X_2, \ldots, x_n$ thereon. The values of $f(x)$ at points $x$ not equal to $x_i$ can be substituted (i.e., interpolated) by the values of another function $g(x)$ passing through $n+1$ pieces of points $(x_i, fi)$.

The interpolation method is applied on the assumption that there are provided $n+1$ pieces of values at equal spaces $(x_i=a \times i)$. For m satisfying $-n<m$, $n+m+1$ pieces of values equally dividing the interval by $n+m$ are obtained by the values of $g(x)$ in $x_j=a \times (n/(n+m)) \times j$, that is, $g(x_j)=g_j$.

Namely, when the picture element values $f_i$ are given to the picture element line $x$ $i$ ($i=0, 1, 2, \ldots, n$), the interpolation method can be used to calculate the picture element values $g_j$ to the picture element line $x_j$ ($j=0, 1, 2, \ldots, n+m$).

Various interpolation methods, such as a Lagrange interpolation method, Aitken interpolation method, interpolation method based on finite differences (Newton, Gauss), interpolation method based on divided differences, Hermite interpolation method, or spline interpolation method, can be used, not limited to a particular one.

When the correcting calculation for the lateral directions has been carried out, the lengths of the picture element lines in the lateral direction generally differ from each other, not the same length. Because of this, in the case that a two dimensional image data is formed by mapping picture element lines arrayed in the lateral direction into those adjacently arrayed in the longitudinal direction, arranging one ends of the longitudinal picture element lines into a straight line brings about irregularities in a line formed by the other ends thereof. Therefore, the entire picture elements are mapped such that, in the case that the number of picture elements arrayed in each of the lateral direction is odd, the centrally positioned picture element thereof is placed at the center in the longitudinal mapping, on one hand, in the case that the number of those is even, either of picture elements next to the center is placed at the center in the longitudinal mapping. Additionally, if no picture element exists at end portions of each of the mapped picture element lines, it can be assumed that picture elements of a value "zero (minimum value)" exist thereat, thereby producing a rectangle of image data (Y", M", C") of which dimension changes in the lateral direction are corrected.

Next, in step S6, it is determined whether or not the correcting calculation for all the lateral picture element lines for each of image data of Y, M and C colors has been completed. If having not been completed, the processing returns to step S4, and then repeat the same correction as above for the next lateral picture element line. By contrast, if the correction has been completed for all the lines, the processing proceeds to step S7.

In step S7, for each of the image data (Y'+M'+C'), (M'+C') and (C') obtained in step S2, dimension change rates in the longitudinal direction are calculated correspondingly to picture element values for each picture element. In this calculation, the dimension change data shown in FIG. 2 are referred.

Then, in step S8, calculated is an average dimension change rate over all the longitudinal picture element lines of each of the above three sets of image data. For example, for each set of image data, all the longitudinal dimension change rates for all the lines are converted into the average dimension change rate in a simple averaging fashion.

Then, in step S9, the average dimension change rate in the longitudinal direction obtained in step S8 is compared with a given value (reference value or allowable value) in order to determine whether the longitudinal dimension changes need to be corrected or not. The processing proceeds to step S10, provided at least one of the sets of image data which has proved to need the correction.

By contrast, when the above determination is that the correction need not to be performed for all the sets of image data, the image data (Y", M", C") which had been obtained in step S6 are specified as corrected image data (Yc, Mc, Cc).

In step S10, in the same method as in step S5, for one or more sets of the image data (Y", M", C") (i.e., among image data of Y", M" and C" colors, for each set of image data which receive the determination that the correction is required), the correction for longitudinal dimension changes is carried out on the basis of each average dimension change rate obtained in step S8.

Then, in step S11, whether all the longitudinal lines have been corrected or not is determined. When all the correction has been completed, a series of steps for producing corrected image data is terminated. However, such correction has not yet been finished for all the lines, the processing is returned to step S10 to repeat the process.

Figure 4:
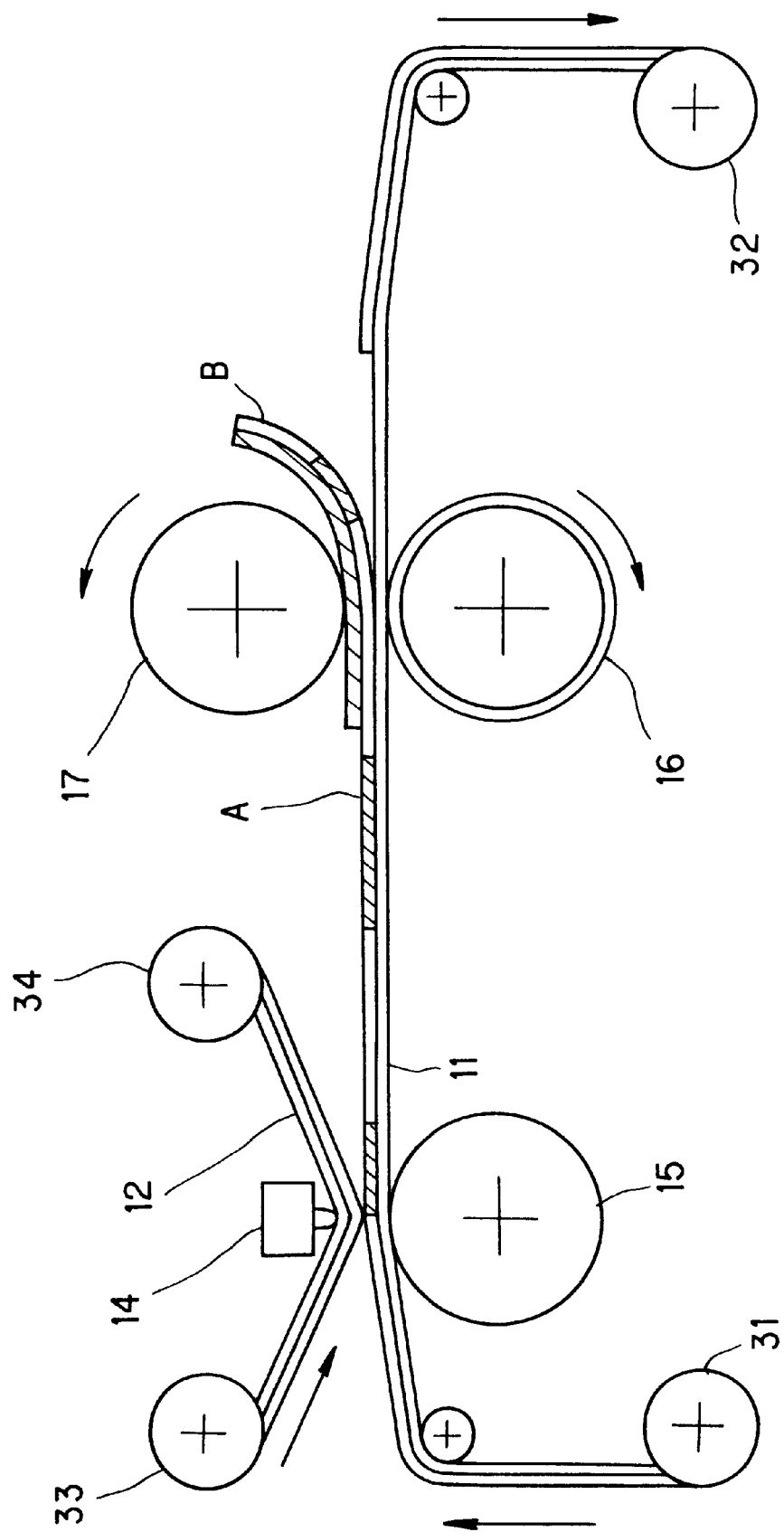
FIG. 4 exemplifies the construction of a thermal transfer recording apparatus capable of using an intermediate transfer recording medium.

A process for recording the corrected image data thus-obtained onto a recording medium. FIG. 4 exemplifies the schematic construction of a main part of a thermal transfer recording apparatus which operates using an intermediate transfer recording medium. Specifically, a continuous intermediate transfer recording medium 11 and a continuous thermal transfer sheet 12 are supplied and conveyed from supplying rolls 31 and 33, respectively, and pressed together between a thermal head 14 and platen roll 15 in a printing unit portion, during which time thermal energy is applied according to image information from the thermal head 14. Applying the heat permits a coloring material contained in the thermal transfer sheet 12 to be transferred into a receptor layer of the intermediate transfer recording medium 11, forming an image "A" therein. The thermal transfer sheet 12 is then reeled by a reeling roll 34. The intermediate transfer recording medium 11 in which the images "A" has been formed is conveyed without a rest to a transferring unit portion, wherein the medium 11 is pressed, together with a transfer receiving material "B", between a heating roll 16 and pressure roll 17. Heating from the heating roll 16 allows the image-formed receptor layer of the intermediate transfer recording medium 11 to be transferred to the transfer receiving material "B". A reeling roll 32 reels the intermediate transfer recording medium from which images have been transferred.

In FIG. 4, the intermediate transfer recording medium 11 is conveyed by means for conveying the intermediate transfer recording medium, in which the medium 11 is supplied and conveyed from the roll 31 for supplying the intermediate transfer recording medium, conveyed in succession via the platen roll 15 in the printing unit portion and the transferring unit portion associated with the transfer receiving material, and reeled by the roll 32 for reeling the intermediate transfer recording material. The supplying roll 31, platen roll 15 and reeling roll 32 are coupled with reversely-rotatable rotating and driving shafts (not shown). Also, the thermal transfer sheet 12 is conveyed by means for conveying the thermal transfer sheet, where the sheet is supplied and conveyed from the roll 33 for supplying the thermal transfer sheet to the printing unit portion associated with the intermediate transfer recording medium, and then reeled by the roll 34 for reeling the thermal transfer sheet, which is coupled with a rotating and driving shaft (not shown). The thermal transfer sheet 12 for color image recording has a substrate sheet on which a coloring material layer along which the sections of coloring materials are in turn arranged in its lengthwise direction, the coloring materials being either for the three substractive primaries of yellow (Y), magenta (M) and cyan (C) or four colors consisting of the three primary colors and black (K). On one hand, the intermediate transfer recording medium 11 for color image recording is conveyed backward to its initial printing position by reversely-rotating the supplying roll 31 immediately after printing for one color have been completed, and waits for the next color printing. Additionally, the supplying roll 31 for the intermediate transfer recording medium has an appropriate braking device (not shown) which applies an appropriate tension to the medium in the longitudinal direction (parallel to a conveying direction) during printing thereto.

The thermal head 14, which serves as selective heating means in the printing unit portion, consists of, for instance, a linear thermal head. The head presses the thermal transfer sheet 12 and intermediate transfer recording medium 11 conveyed and superposed, in association with the platen roll 15, and generate heat according to image information. In response to this heat generation, a coloring material is at least transferred from the coloring material layer of the thermal transfer sheet into the receptor layer of the intermediate transfer recording medium, thereby the image "A" being formed. In the sublimation type thermal transfer, a sublimation dye is transferred as a coloring material. In contrast, in the heat fusion type thermal transfer method, a binder containing dispersed coloring materials, together with coloring materials, that is, a coloring material layer, is transferred.

The intermediate transfer recording medium 11 is repeatedly conveyed forward and backward, with the result that the image "A" is formed on the medium 11 by superposing one on another monochromatic images of specified colors. The medium 11 is then conveyed to the transferring unit portion, where it is superposed with the transfer receiving material "B", and forcibly held between the heating roll 16 and pressure roll 17. Only the image-formed receptor layer on the intermediate transfer recording medium is therefore transferred onto the transfer receiving material "B", forming a final objective image thereon.

Furthermore, intermediate transfer recording media available in practicing the method and apparatus for thermal transfer recording according to the present invention will now be explained. The intermediate transfer recording medium is not restricted to a particular one, as long as the medium is capable of temporarily storing coloring materials transferred from a thermal transfer sheet, and transferring those coloring materials to a transfer receiving material. Various kinds of intermediate transfer recording media available for the sublimation type thermal transfer method will be listed below.

Figure 5:
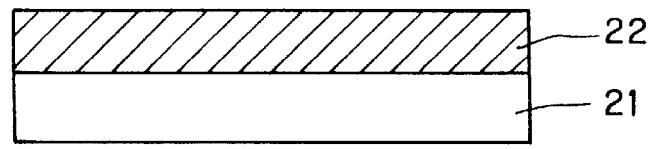
FIG. 5 is one example showing the cross sectional view of an intermediate transfer recording medium which can be used in the present invention.

As shown in FIG. 5, the intermediate transfer recording medium 11 is provided with a substrate sheet 21 and, at least, a receptor layer 22 peelably provided on the substrate sheet 21.

Since the intermediate transfer recording medium can be regarded as a second thermal transfer sheet to a transfer receiving material, materials available for conventional thermal transfer sheets can also be used as the substrate sheet 21. For example, available materials are oriented or non-oriented films made of resin (such as polyester resin including polyethylene terephthalate, polyethylene naphthalate, and polybutylene terephthalate; high heat resistant resin including polycarbonate, polyphenylene sulfide, polyether ether ketone, polyether sulphone, and polyimide; polyolefin resin including polyethylene, polypropylene, polymethylpentene, and polyethylene copolymer; cellulose resin such as cellulose acetate; chlorine-containing resin including polyvinyl chloride and polyvinylidene chloride; various kinds of resin including polystyrene, polyamide and ionomer); thin sheets of paper (such as glassine paper, condenser paper and paraffin paper); or other members formed by appropriately laminating any of the above-listed materials one on another. The thickness of the substrate sheet is properly selected in consideration of various factors, such as strength, thermal conductivity, and heat resistance, and normally a thickness of 1 to 10 $\mu$m is preferably selected. By practicing the present invention, even when a substrate sheet made of the same kind of material as conventional one is used, the contraction in dimensions can become small, or, even when a substrate sheet made of a material whose the contraction in dimensions are large, the contraction equivalent to conventional one can be at least realized.

The receptor layer 22 consists of at least a binder resin, and if necessary, various kinds of addition agents, such as releasing agent, are added thereto. It is preferable to use a binder resin having a greater dyeability to sublimation dye. Materials available as the binder resin are polyorefin resin such as polypropylene; halogen-containing resin such as polyvinyl chloride and polyvinylidene chloride; vinyl resin such as polyvinyl acetate and polyacrylate; polyester resin such as polyethylene terephthalate and polybutylene terephthalate; polystyrene resin; polyamide resin; copolymer of olefin (such as ethylene and propylene) and other vinyl monomer; ionomer; and derivatives of cellulose. Of these, preferable materials are vinyl resin and polyester resin. Preferably, in order to prevent thermal fusion caused with a thermal transfer sheet, a releasing agent is added into the above binder resin forming the receptor layer. As the releasing agent, such materials as silicone oil, phosphoric ester surfactant, or fluorocompound are used, and particularly, the silicone oil is preferably used. The releasing agent is added, preferably, by an amount appropriately selected from a range of 0.2 to 30 parts by weight against 100 parts by weight of binder resin composing the receptor layer.

Additionally, the receptor layer is formed on a substrate sheet by applying coating solution or ink prepared by dissolving or dispersing the foregoing binder resin and, if necessary, addition agents such as a releasing agent or the like into solvent such as water or organic solvent by means of ordinary known methods, including such coating methods as gravure coating, gravure reverse coating, or bar coating, and such printing methods as gravure printing or silk screen printing. Favorably, the receptor layer is 0.1 to 10 $\mu$m in thickness.

Figure 6:
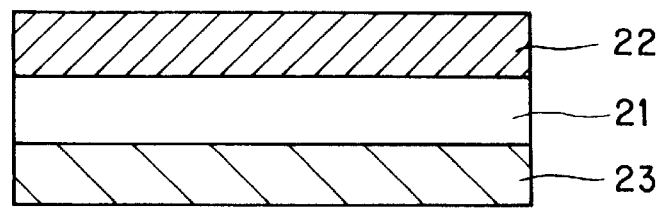
FIG. 6 is another example showing the cross sectional view of an intermediate transfer recording medium which can be used in the present invention.

In order to prevent thermal fusion to heating means, such as a thermal head or thermal roll, thus improving slidable ability, it is preferred that, as shown in FIG. 6, the intermediate transfer recording medium is provided with a back surface layer 23 formed on one surface of the substrate sheet 21 of which other surface rigidly receives the receptor layer 22.

Kinds of resin available for the back surface layer are, for example, such cellulose resin as ethyl cellulose, hydroxy cellulose, hydroxypropyl cellulose, methyl cellulose, cellulose acetate, cellulose acetate butyrate, or nitro cellulose; such vinyl resin as polyvinyl alcohol, polyvinyl acetate, polyvinyl butyral, polyvinyl acetal, or polyvinyl pyrrolidone; or such acrylic resin as polymethyl methacrylate, polyethyl acrylate, polyacrylamide, or acrylonitrile-styrene copolymer; polyamide resin; vinyltoluene resin; coumarone-indene resin; polyester resin; polyurethane resin; silicone-modified urethane resin; or fluorine-modified urethane resin; which are used in a form of sole substance or mixture.

One preferable example of this back surface layer arranged for preventing thermal fusion is that by using not only resin containing reactive moieties, such as hydroxyl groups, among the foregoing kinds of resin, but also polyisocyanate combinedly employed as cross linking agent, there is provided a cross-linked resin layer. Furthermore, in order to provide slidable ability to a heating device, such as a thermal head, a technique is usable that solid or liquid releasing agent or slipping agent is added to the back surface layer, thus presenting a heat resistant slipping property, i.e., slipping property effective even at a high temperature. As the releasing agent or slipping agent, available materials are, for example, various groups of wax, such as polyethylene wax or paraffin wax; higher aliphatic alcohol; organopolysiloxane; anionic surfactant; cationic surfactant; amphoteric surfactant; nonionic surfactant; fluorosurfactant; organic carboxylic acid and its derivatives; fluororesin; silicone resin; particles made of inorganic compound such as talc or silica. The release agent or the slipping agent is added by an amount selected from a range of 5 to 50 weight percentage (wt %) against all the solid component of the back surface layer, preferably, by an amount ranging 10 to 30 weight percentage. The back surface layer is formed by the same method as for the foregoing receptor layer, and its preferable thickness ranges approximately from 0.1 to 10 $\mu$m.

Figure 7:
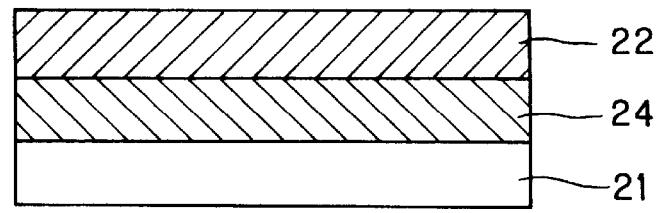
FIG. 7 is another example showing the cross sectional view of an intermediate transfer recording medium which can be used in the present invention.

In the intermediate transfer recording medium, for the purpose of controlling the peelable ability of the receptor layer to the substrate sheet, a release layer 24 may be disposed between the substrate sheet 21 and the receptor layer 22, as shown in FIG. 7. When the receptor layer is peeled off, the release layer remains on the surface of the substrate sheet. The release layer is composed of either binder resin and, if necessary, material having a releasing property added to the binder resin, or resin having a releasing property. Materials available for the binder resin are, for example, such vinyl resin as acrylic resin, polyvinyl acetate, or vinyl chloride-vinyl acetate copolymer; such cellulose resin as nitro cellulose; polyester resin; and such thermosetting resin as urethane resin, unsaturated polyester resin, or aminoalkyd resin. As the material having a releasing property, usable are a group of wax, silicone oil, silicone resin, fluororesin, and the like. As the resin having a releasing property, usable are a group of silicone resin, melamine resin, fluororesin, and the like. A preferable thickness of the release layer ranges 0.1 to 5 $\mu$m.

Figure 8:
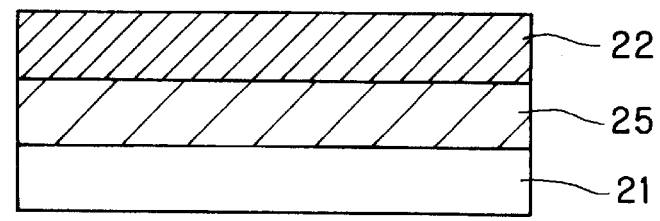
FIG. 8 is still another example showing the cross sectional view of an intermediate transfer recording medium which can be used in the present invention.

Still, to protect the receptor layer transferred onto a transfer receiving material together with an image, as depicted in FIG. 8, a protect layer 25 transferable from the intermediate transfer recording medium to the transfer receiving material may be disposed between the substrate sheet 21 and the receptor layer 22. After having been transferred, the protect layer 25 becomes an upper layer positioning on the receptor layer, thus enhancing weather resistance of images and durability against fingerprints and/or chemicals. The protect layer consists of at least binder resin, and, as its material, usable is such cellulose resin as nitro cellulose; acrylic resin; such vinyl resin as vinyl chrloride-vinyl acetate copolymer; such thermosetting resin as urethane resin, unsaturated polyester resin, or aminoalkyd resin; ionizing radiation hardenable resin hardening by ultraviolet rays or an electron beam, or the like. A favorable thickness of the protect layer resides in a range of 0.1 to 20 μm. A configuration to use both the protect and release layers is also possible.

Additionally, as a thermal transfer sheet available for the method and apparatus according to the present invention, any thermal transfer sheet in either of the sublimation type thermal transfer method or the heat fusion type thermal transfer method, both of which are conventionally known, can be used. In the former method, in response to applied heat, only dyes contained in coloring material layers are transferred to form an image. In the latter method, coloring materials contained in binders are transferred, together with fused binders of the coloring material layers, thereby forming an image solidified with the coloring material layers. Although the present invention can be used in either thermal transfer method, those methods have differences in effectiveness depending on their inherent transfer principles; in the heat fusion type thermal transfer method, because of transfer of fused coloring material layers onto a transfer receiving material, the fused coloring material layers can be filled out in irregularities which might exist on the surface of the transfer receiving material, on one hand, in the sublimation type thermal transfer method, because only the coloring materials are transferred, irregularities on the surface of a transfer receiving material have a direct influence on a formed image. This means that the present invention which can be adapted to the intermediate transfer recording medium is particularly effective for this sublimation type thermal transfer method.

EXAMPLE

Using the thermal transfer recording apparatus (thermal transfer recording means) shown in FIG. 4, an image was formed on an intermediate transfer recording medium by the sublimation type thermal transfer method. The intermediate transfer recording medium was 220 mm in width. Using an A4-width (210 mm), thin-film thermal head (average resistance is 3300 Ω), an original image data consisting of picture elements of 1744 in width by 1771 in length was printed at a resolution degree of 300 dpi in condition that an applying voltage was 18.0 volts and a printing cycle was 10 ms/line.

As the thermal transfer sheet, an ink sheet was used, on which layers of yellow (Y), magenta (M) and cyan (C) are laterally arranged along the surface. As the intermediate transfer recording medium, a construction shown in FIG. 5 was used, in which a PET (polyethylene terephthalate) film having a thickness of 12 μm was employed as its substrate material on which a receptor layer composed of vinyl chloride-vinyl acetate copolymer having a thickness of 2 μm was disposed.

To execute data processing for obtaining a corrected image data from the original image data, used was a separate personal computer online-connected to the thermal transfer recording apparatus depicted in FIG. 4. For not only the picture element lines in each of the lateral and longitudinal directions but also each color, thresholds for applied thermal energy were defined direction by direction and color by color. If a total amount of thermal energy applied along each the lines in each direction was equal to or less than a defined threshold, the original data for that line were not subjected to the correction of the data (i.e., increase or reduction of picture elements), while if there was found a line in which the total amount exceeded a defined threshold, picture elements for this line were added to the original data by specified quantities depending on an exceeded amount of the energy. The addition were performed such that a picture element having the least picture element value was selected among corresponding each picture element line and new picture elements having the same picture element value as selected were newly created adjacently to the selected picture element.

As a result, it was found that an objective color image formed on the intermediate thermal recording medium had not a completely accurate superposition of images of yellow (Y), magenta (M) and cyan (C), but misregistration among those images could hardly be seen.

COMPARATIVE EXAMPLE

Like the embodiment in this comparative example, the thermal transfer recording apparatus explained in FIG. 4 was used for forming an image on an intermediate thermal recording medium by the sublimation type thermal transfer method, except that original image data were used without any correction. The result was that in an objective color image formed, images of cyan (C), magenta (M) and yellow (Y) were increased in dimensions in this order, owing to the fact that the substrate material of the intermediate transfer recording medium contracted in the lateral direction due to heat in recording. Differences in image dimensions of yellow (Y) and cyan (C) depended on positions, and a length corresponding to 20 picture elements at its maximum was found in the lateral direction. The substrate material of the intermediate thermal recording medium elongated in the longitudinal direction, and differences in image dimensions of yellow (Y) and cyan (C) reached a length corresponding to 6 picture elements at its maximum in the longitudinal direction.

The present invention is not restricted to the embodiment described above, and can be applied to a variety of alternative examples within the technical concept according to the invention.

For instance, in the process for producing corrected image data (refer to FIG. 3) in the foregoing embodiment, a correcting amount for dimension changes for each lateral line is equally distributed to the whole of that lateral line. In this respect, an alternative example is that larger correcting amounts are given for regions (or portions) representing larger picture element values (i.e., larger dimension changes), on the contrary, smaller correcting amounts for regions (or portions) representing smaller picture element values (i.e., smaller dimension changes). Still, modification can be directed to the foregoing processing of correction, i.e., the correction repeatedly carried out for each lateral line in the lateral direction (steps S4 to S6) and the correction carried out at a time for all the longitudinal lines (steps S8 to S11). Instead, for the longitudinal direction, using the image data (Y", M", C") as those for calculating the longitudinal dimension change rates (refer to step S7) enables correction for each longitudinal line. Still, as in the foregoing experimental example, more simplified correction methods can be used for producing the corrected image data. Although using strict correction methods needs lots of calculation time, simplified ones makes the calculation time shorter. In general, the longitudinal direction is distinguishably smaller in dimension change rates than the lateral direction. Therefore, there can be provided an alternative technique that dimension changes are corrected in an accurate manner for the lateral direction, but corrected in a simplified manner or omitted for the longitudinal direction.

Still, while the overprinting of multiple colors has been described in the above, the overprinting of letters and patterns or the overprinting of frames and data, such as documents, can also be practiced according to the present invention. The overprinting can be replaced by one time of recording. Even when a single printing process which is not the overprinting process is carried out, the image can be formed in accurate dimensions by the present invention. Moreover, the recording medium of which dimension changes are corrected is not confined to an intermediate transfer recording medium, and the present invention can be applied to any recording medium for accomplishing recording in accurate dimensions.

What is claimed is:

1. A method of thermal transfer recording comprising the steps of:

obtaining corrected image data by performing either one of enlargement and contraction of image data depending on dimension changes caused in a recording medium if thermal transfer recording is performed; and performing on the recording medium the thermal transfer recording based on the corrected image data.

2. The method according to claim 1, wherein, in the obtaining step, a plurality of sets of the corrected image data are obtained by performing a plurality of times either of the enlargement and the contraction on the image data depending on the dimension changes caused in the recording medium if the thermal transfer recording is performed a plurality of times; and in the performing step, performing on the recording medium a plurality of times of the thermal transfer recording based on each of a plurality of sets of the corrected image data.

3. The method according to claim 1, wherein either of the enlargement and contraction of the image data is performed in a primary scanning direction and/or in a secondary scanning direction on an independent value set direction by direction.

4. The method according to claim 1, wherein the enlargement of the image data is performed by adding a picture element to the image data and the contraction of the image data is performed by deleting a picture element from the image data.

5. The method according to claims 1, wherein the recording medium is an intermediate transfer recording medium used by a method of thermal transfer recording by which a thermal transfer sheet having a thermally transferable coloring material layer and the intermediate transfer recording medium having a receptor layer are pressed between a heating device and a platen in a manner that the coloring material layer and the receptor layer are superposed with each other, the heating device is heated according to the image data, thereby a coloring material contained in the coloring material layer being transferred into the receptor layer for forming an image, the image formed on the intermediate transfer recording medium being then transferred, together with the receptor layer, onto a transfer receiving material.

6. An apparatus for thermal transfer recording comprising:

image dimension correcting means for obtaining corrected image data by either of enlargement and contraction of image data based on data indicative of changes in dimensions caused in a recording medium if thermal transfer recording is performed, and thermal transfer means for performing the thermal transfer recording onto the recording medium on the basis of the corrected image data.

* * * * *